United States Patent [19]

Sakakiyama et al.

[11] Patent Number: 4,675,817
[45] Date of Patent: Jun. 23, 1987

[54] SYSTEM FOR CONTROLLING AN ELECTROMAGNETIC CLUTCH FOR A VEHICLE

[75] Inventors: Ryuzo Sakakiyama, Tokyo; Motohisa Miyawaki, Chofu, both of Japan

[73] Assignee: Fuji Jukogyo Kabushiki Kaisha, Tokyo, Japan

[21] Appl. No.: 695,980

[22] Filed: Jan. 29, 1985

[30] Foreign Application Priority Data

Jan. 31, 1984 [JP] Japan .................................. 59-15412

[51] Int. Cl.⁴ ........................ B60K 41/22; F16D 27/16
[52] U.S. Cl. ............................... 364/424.1; 192/0.032; 192/0.052; 192/0.076
[58] Field of Search .................... 364/424.1; 192/0.03, 192/0.032, 0.033, 0.52, 0.75, 0.76, 3.58

[56] References Cited

U.S. PATENT DOCUMENTS

| | | | |
|---|---|---|---|
| 4,457,411 | 7/1984 | Hiramatsu | 192/0.076 |
| 4,461,374 | 7/1984 | Umezawa | 192/0.052 X |
| 4,494,639 | 1/1985 | Takano et al. | 192/0.052 |
| 4,494,641 | 1/1985 | Sakakiyama | 192/0.076 |
| 4,514,811 | 4/1985 | Daubenmier et al. | 364/424.1 |
| 4,518,068 | 5/1985 | Oguma et al. | 192/0.052 |

FOREIGN PATENT DOCUMENTS 57-160724  10/1982  Japan .

*Primary Examiner*—Felix D. Gruber
*Attorney, Agent, or Firm*—Martin A. Farber

[57] ABSTRACT

A system for controlling an electromagnetic clutch has a vehicle speed sensor and an accelerator pedal switch. The clutch current is cut off at a low speed of a vehicle in response to a signal of the accelerator pedal switch at the release of an accelerator pedal. The system is arranged to supply a small drag current to the coil of the clutch in a very low vehicle speed range including stopping of the vehicle.

4 Claims, 6 Drawing Figures

SYSTEM FOR CONTROLLING AN ELECTROMAGNETIC CLUTCH FOR A VEHICLE

BACKGROUND OF THE INVENTION

The present invention relates to a system for controlling the clutch torque of an electromagnetic clutch for an infinitely variable belt-drive transmission.

Regarding the system for controlling the clutch torque during starting of a vehicle, Japanese Patent Laid-open 57-160724 which corresponds to U.S. Pat. No. 4,518,068 discloses a control system wherein a very small amount of clutch torque is supplied and increased stepwise in relation to engine speed during the initial period of the clutch engagement, in order to establish a smooth and rapid engagement of the clutch when starting a vehicle.

The combination of the above-mentioned type of electromagnetic clutch with an infinitely variable belt-drive transmission system has already been proposed. The infinitely variable belt-drive transmission system enables a continuous infinitely variable change speed. However, there remain many problems to solve that may occur when the system is actually mounted on a vehicle, such as static friction torque generated in the pulleys and belt device. Since the transmission ratio during the starting operation of the vehicle is at maximum value and the power transmission torque at the pulleys and belt device is large, the belt is pressed against the pulleys with a large pressure. Accordingly, the static friction torque becomes large. Therefore, most of the engine power transmitted through the engagement of the clutch when starting the vehicle is consumed by the static friction torque, resulting in a slow-moving start of the vehicle, unpleasant vibration occurring when the static friction torque disappears and dynamic friction torque generated, and noise generated by engagement between the teeth of the gears disposed with backlashes.

To cope with the problems, it has been proposed to apply a very small drag torque to the clutch before starting a vehicle. The generation of the drag torque is caused by detecting a very low vehicle speed and the release of an accelerator pedal. On the other hand, in the infinitely variable belt-drive transmission, during deleration, the transmission is automatically downshifted to a high transmission ratio, and finally to a maximum transmission ratio. At a proper state, it is necessary to disengage the clutch before the vehicle is fully stopped in order to avoid stalling of the engine. However, if the drag torque is generated with the clutch disengaged, the vehicle is greatly braked by the engine braking effect because of the high transmission ratio. Consequently, the coasting performance of the vehicle is reduced.

SUMMARY OF THE INVENTION

The object of the present invention is to provide a control system for an electromagnetic clutch of a vehicle which is capable of improving the starting characteristic of a motor vehicle by applying a drag torque without reducing the coasting performance at deceleration of the vehicle.

To this end, in the system of the present invention, an electromagnetic clutch is entirely disengaged when the speed of a vehicle decreases below a predetermined value and a drag torque is generated in a very low vehicle speed range including stopping of the vehicle.

According to the present invention, there is provided a system for controlling an electromagnetic clutch for a vehicle having an infinitely variable belt-drive transmission.

The system comprises a vehicle speed sensor for producing a signal dependent on vehicle speed, an accelerator pedal switch for producing a signal when an accelerator pedal of the vehicle is released, first means for supplying a clutch current to a coil of the electromagnetic clutch in accordance with driving conditions of the vehicle, second means responsive to the signal of the accelerator pedal switch for cutting off the clutch current when the vehicle speed decreases below a predetermined value, and third means responsive to the signal of the accelerator pedal for generating a drag current in a very slow vehicle speed range including the stop of the vehicle.

In an aspect of the present invention, the system further comprises an engine speed sensor for producing a signal dependent on the engine speed, and means for supplying the clutch current which increases with an increase of the engine speed in response to the signal of the engine speed sensor at the start of the vehicle.

The other objects and features of this invention will become understood from the following description with reference to the accompanying drawings.

DETAILED DESCRIPTION OF THE PREFERRED EMBODIMENT

Figure 1A:
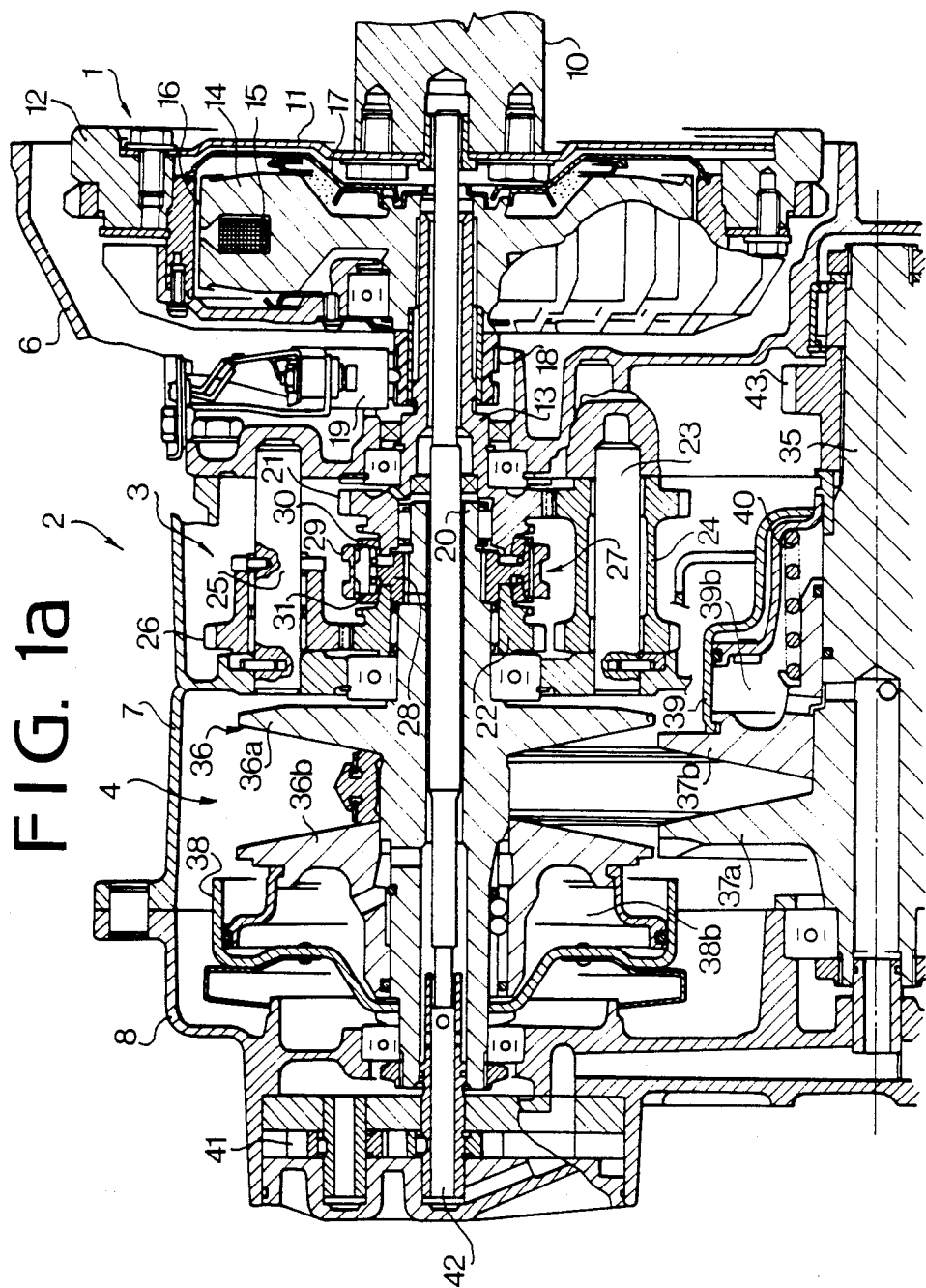
FIGS. 1a and 1b are sectional views of an infinitely variable belt-drive transmission to which the present invention is applied.
Figure 1B:
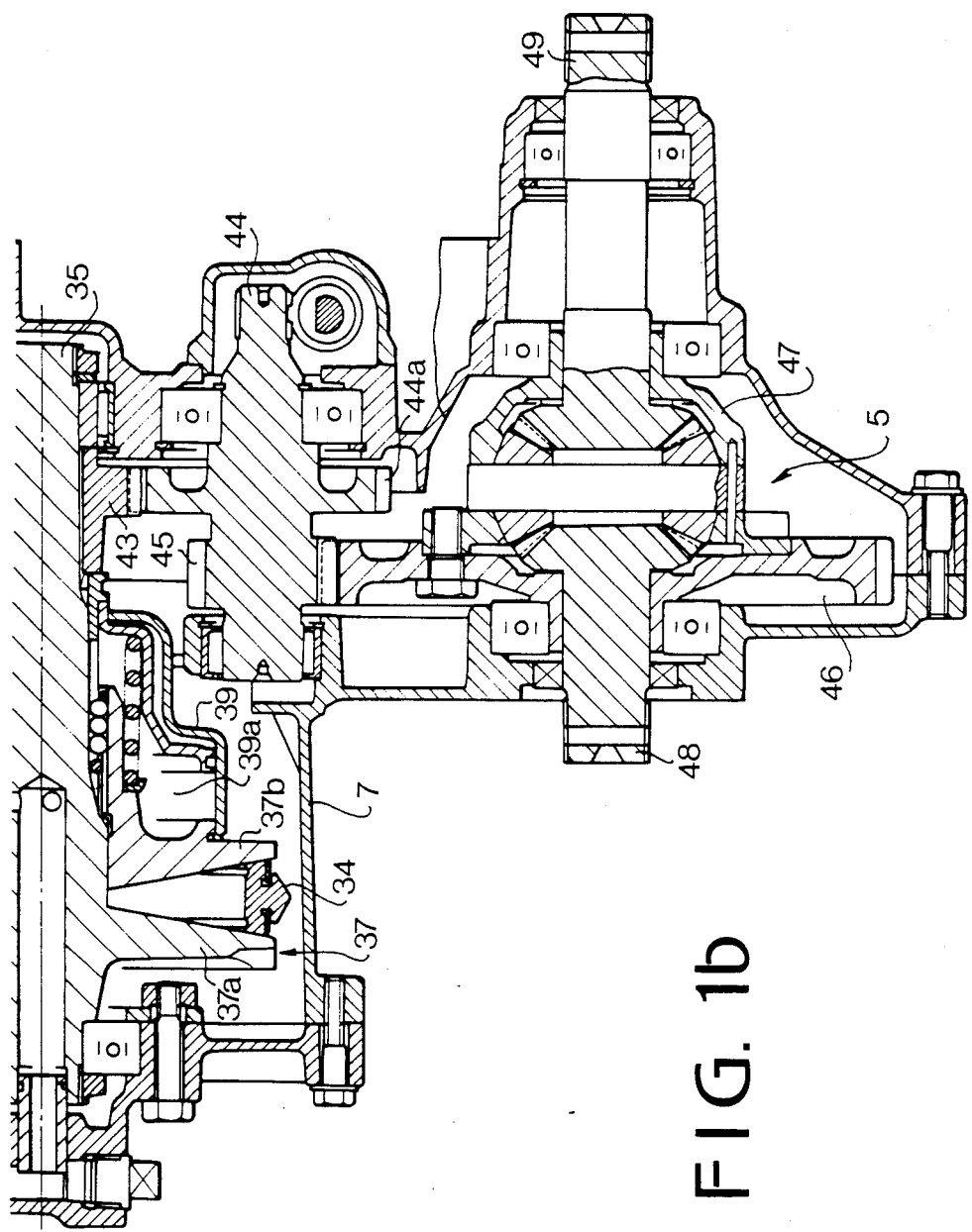

Referring to FIGS. 1a and 1b, an infinitely variable belt-drive automatic transmission for a vehicle, to which the present invention is applied, comprises an electromagnetic powder clutch 1, an infinitely variable belt-drive transmission 2, a selector device 3, pulleys and belt devices 4, final reduction device 5, and a pressure oil control circuit (not shown). The electromagnetic powder clutch 1 is provided in a housing 6. The selector device 3, pulleys and belt devices 4, and final reduction device 5 are provided in a main housing 7 and a side housing 8. A crankshaft 10 of an engine (not shown) is connected to an annular drive member 12 through a drive plate 11 of the electromagnetic powder clutch 1. The electromagnetic powder clutch comprises a driven member 14, and a magnetizing coil 15 provided in the driven member 14. The driven member 14 has its outer periphery spaced from the inner periphery of the drive member 12 by a gap 16, and a powder chamber 17 is defined between the drive member 12 and driven member 14. Magnetic powder is provided in the powder chamber 17. The driven member 14 is secured to an input shaft 13 of the belt-drive transmission. A holder secured to the driven member 14 carries slip rings 18 which are electrically connected to the coil 15. The coil 15 is supplied through brushes 19 and the slip rings 18 with current from a control circuit for the electromagnetic powder clutch.

When the magnetizing coil 15 is excited by the clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with the input shaft 13, a reverse driven gear 22 rotatably mounted on the main shaft 20, and a synchronizer 27 mounted on the main shaft 20. The drive gear 21 meshes with one of gear counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of the driven gear 22 through rings 30 or 31.

At a neutral position (N range) or a parking position (P-range) of a selector lever 50 (FIG. 2), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive range (D range) or a high engine speed drive range (Ds-range).

When the sleeve 29 is engaged with the gear 22, the input shaft 13 is connected to the main shaft 20 through gears 21, 24, 26 and 22 to provide a reverse driving position (R range).

The main shaft 20 has an axial passage in which there is mounted an oil pump driving shaft 42 connected to the crankshaft 10 mounted. An output shaft 35 is provided in parallel with the main shaft 20. A drive pulley 36 and a driven pulley 37 are mounted on the shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder secured to the main shaft 20 to form a servo device 38. A chamber 38a of the servo device 38 communicates with an oil pump 41 through the pressure oil control circuit. The oil pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite the disc 36a. Movable conical disc 37b has a cylindrical portion in which a piston portion of the output shaft 35 is slidably engaged to form a servo device 39. A chamber 39a of the servo device 39 is communicated with the oil pump 41 through the pressure oil control circuit. A spring 40 is provided toward the movable conical disc 37b to the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of driving wheels of the vehicle through a differential 47.

The pressure oil control circuit is responsive to vehicle sped, engine speed and throttle valve position for controlling the oil from the oil pump 41 to the servo devices 38 and 39 thereby to move the discs 36b and 37b. Thus, the transmission ratio is infinitely changed. When the Ds-range is selected, the transmission ratio is increased by the operation of the pressure oil control circuit.

Figure 2:
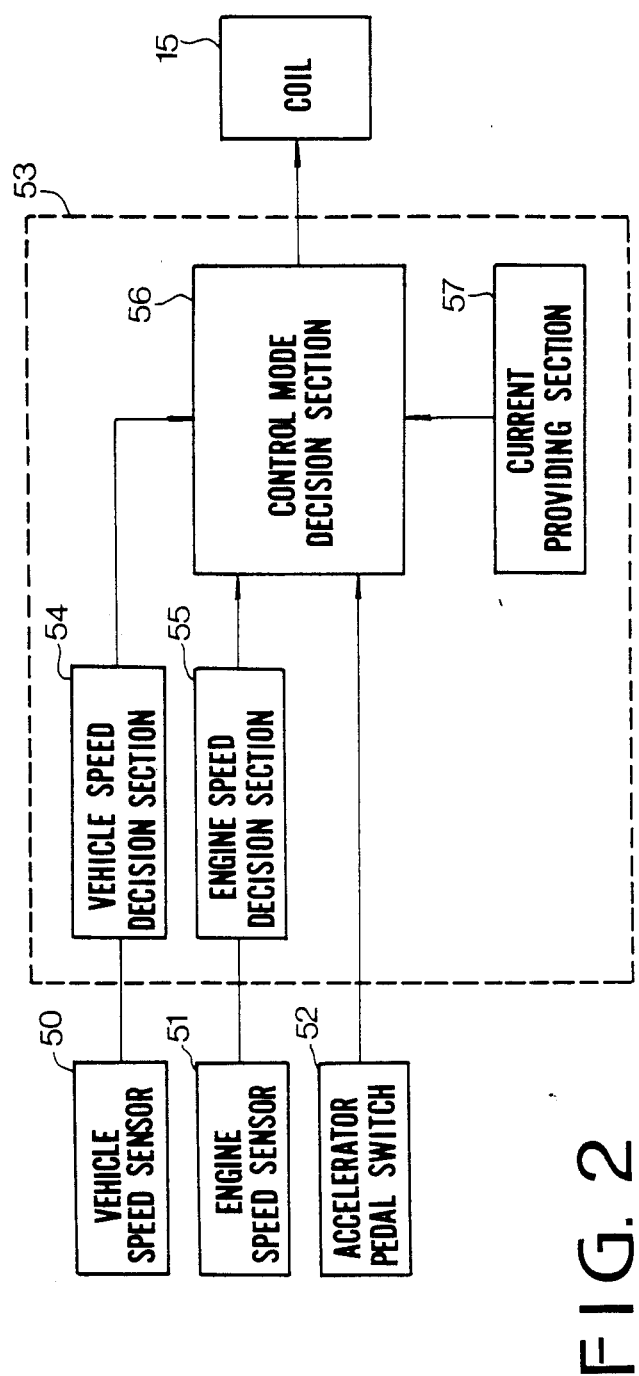
FIG. 2 is a block diagram showing a control system according to the present invention.

Referring to FIG. 2 showing a control system according to the present invention. A vehicle speed sensor 50 produces pulses dependent on vehicle speed, for example an output from a speedometer and an engine speed sensor 51 produces pulses dependent on ignition pulses from an ignition coil, representing engine speed.

An accelerator pedal switch 52 is provided to produce an output signal when an accelerator pedal of the vehicle is released. These output signals and pulses are applied to a control unit 53 which controls the clutch current in dependency on the input signals. The control unit 53 is provided with a vehicle speed decision section 54 applied with the pulses from the vehicle speed sensor 50 and an engine speed decision section 55 applied with the ignition pulses from the engine speed sensor 51.

A control mode decision section 56 is applied with the output signals from the sections 54, 55 and switch 52 to select decide the control mode by which the clutch current is controlled. In accordance with the determined control mode, the section 56 passes current from a current providing section 57 to the coil 15 of the electromagnetic clutch. The current is selected from lock-up current, drag current, zero current, or current varying in proportion to the engine speed, in accordance with the control mode.

Figure 3:
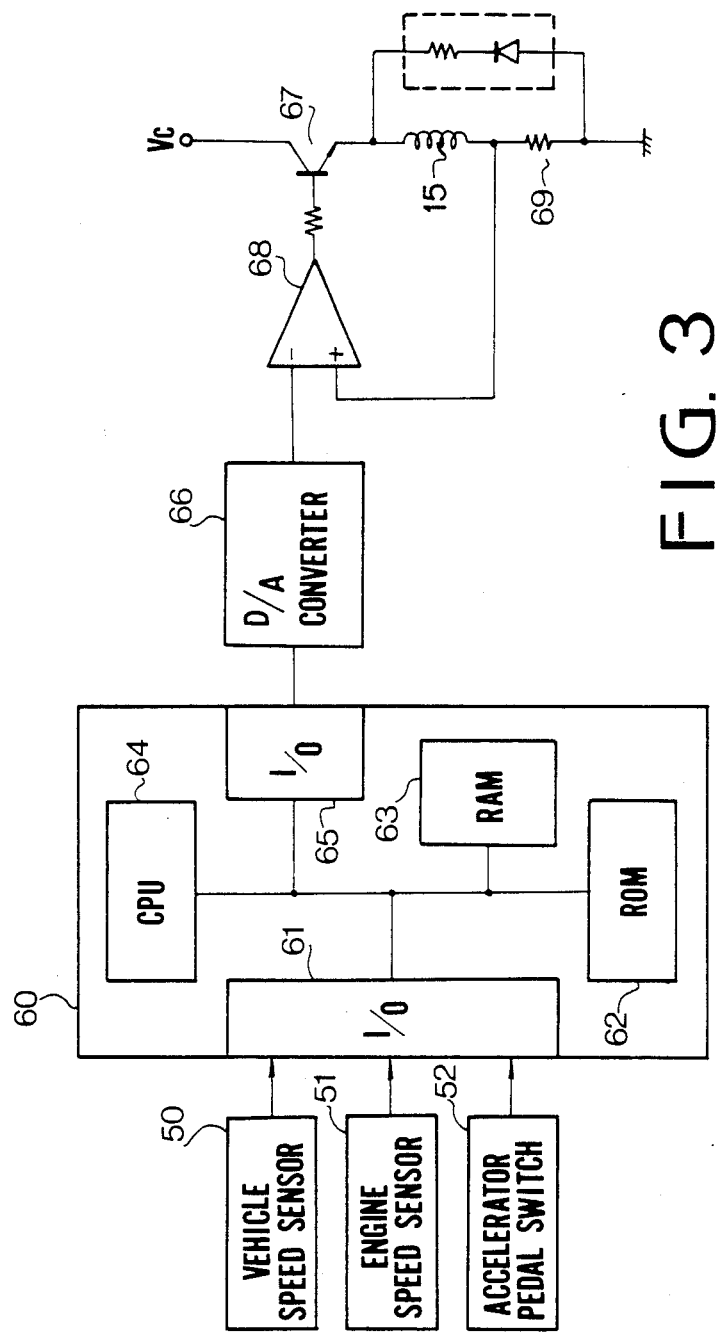
FIG. 3 is a block diagram of a control unit according to the present invention.

Referring to FIG. 3 showing the control circuit employed with a microcomputer 60, the microcomputer is provided with an I/O interface 61 applied with the output signals from the sensors 50, 51 and switch 52, a ROM 62 stored with clutch current set values and programs, a RAM 63 for storing various data, a CPU 64, and an I/O interface 65. The output of the I/O interface 65 is applied to a comparator 68 through a D/A converter 66. The comparator 68 compares the input voltage with a voltage at a resistor 69 which represents the current passing in the coil 15. The output of the comparator 68 is applied to a base of a driving transistor 67 for the coil 15. Thus, the clutch current passing through the coil is controlled by the output voltage of the microcomputer 60, so that the clutch current may coincide with the output voltage.

Figure 4:
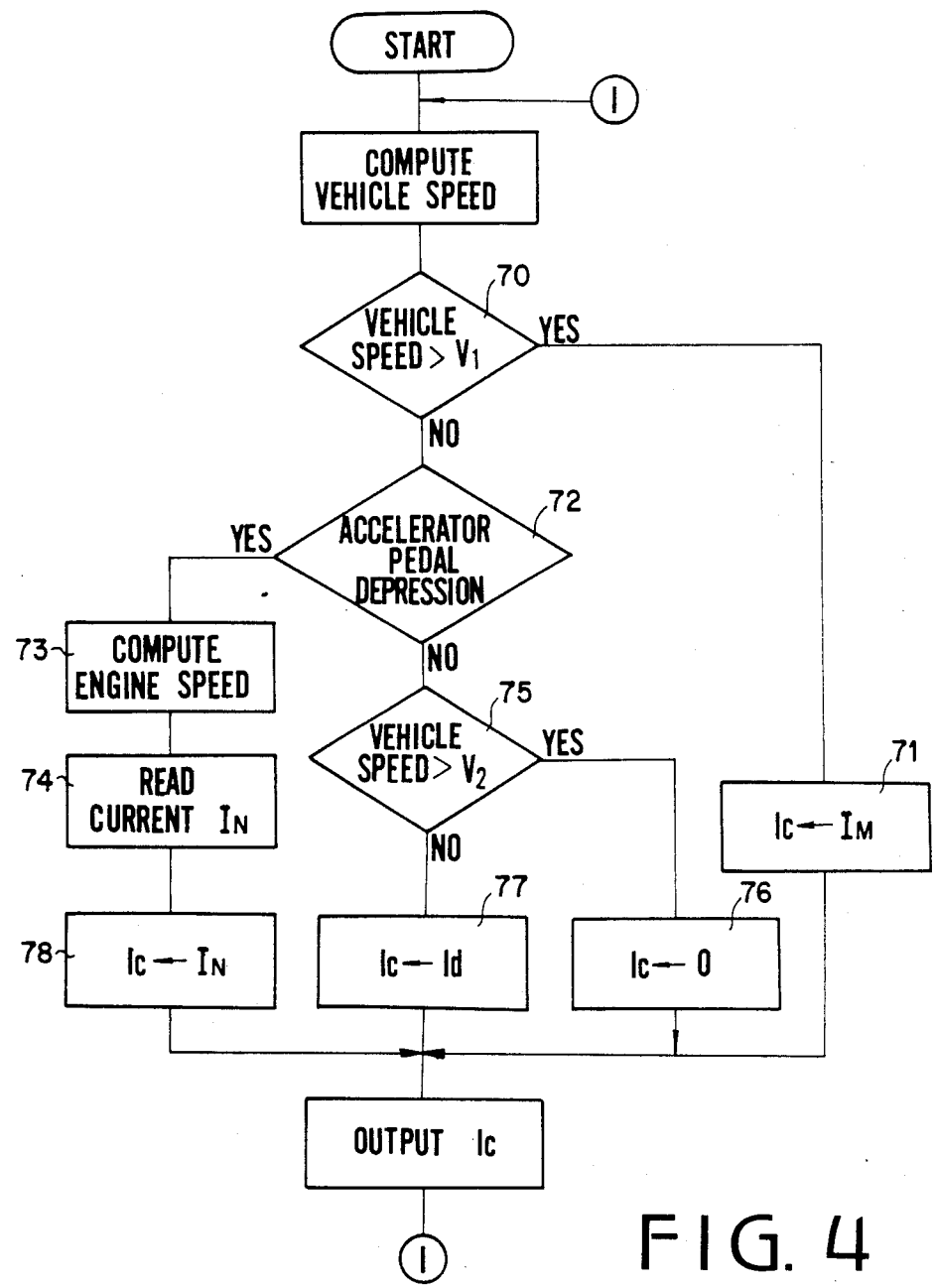
FIG. 4 is a flow chart showing the operation of the control system.
Figure 5:
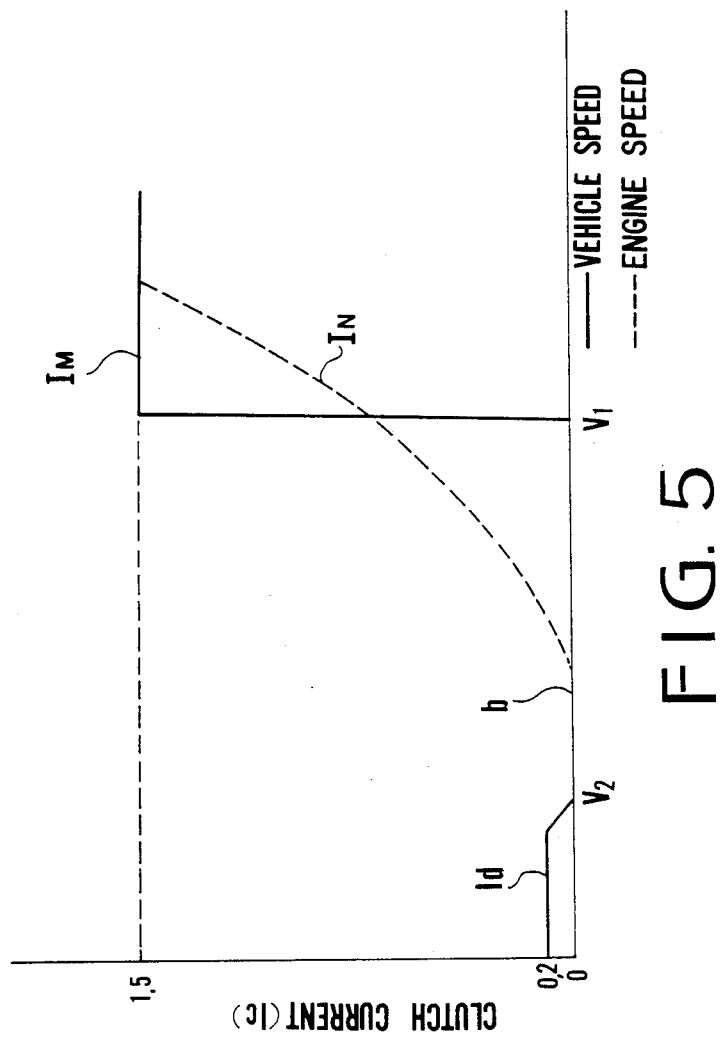
FIG. 5 is a graph showing a relationship between vehicle speed and clutch current.

Referring to FIGS. 4 and 5, in order to determine the clutch control mode, two reference vehicle speeds are set in the system. One of the vehicle speeds is for example 15-20 km/h ($V_1$) at which the clutch current is cut off in order to prevent stalling of the engine. The other is a very low speed ($V_2$), for example, 5-10 km/h. At a higher vehicle speed than the speed $V_1$ determined at step 70, the clutch current Ic is set at a lock-up clutch current Imly step 71 to entirely engage the clutch. At a lower vehicle speed than the speed $V_1$, when the accelerator pedal is depressed determined at step 72, a clutch current $I_N$ is read at step 74. This current is increasing with an increase of the engine speed, computed at step 73 and flows, by step 78 as shown by dotted line $I_N$ in FIG. 5. When the vehicle speed decreases below the speed $V_1$ but is still above the speed $V_2$ as determined at step 75 and the accelerator pedal is released, the clutch current IC becomes almost zero, step 76, as shown by reference b in FIG. 5 to disengage the clutch. Accordingly, even if the transmission is automatically downshifted at the low vehicle speed, the vehicle coasts without engine braking.

When the vehicle speed decreases below the very low speed V2, a drag current Id flows by step 77. The drag current is for example 0.2 A which is about one seventh of the lock-up current of 1.5 A, thereby producing a small drag torque of 0.1–0.3 kgm. By the small drag torque, the power of the engine is slightly transmitted to the pulleys and belt device 4, removing the static friction torque and reducing play between gears. Accordingly, when the clutch is engaged for starting the vehicle, the pulleys and belt device 4 are immediately driven by the power of the engine, since the power is not consumed by the static friction torque. Thus, the vehicle can be smoothly started. It is not necessary to produce the drag torque at the P-range or N-range. On the contrary, when the P-range or N-range is selected at stopping of the vehicle, a small reverse current passes in the coil to remove the residual magnetism to entirely disengage the clutch.

At the Ds-range and R-range, coasting of the vehicle is not necessary, but it is preferable to provide engine braking effect. Accordingly, when the Ds-range or R-range is selected, the vehicle speed $V_1$ is decreased to a low vehicle speed approximately equal to the speed $V_2$. Thus, the drag torque is produced without coasting of the vehicle.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling an electromagnetic clutch for a vehicle having an infinitely variable belt-drive transmission comprising a vehicle speed sensor for producing a first vehicle speed signal when vehicle speed is higher than a predetermined first low speed and for producing a second vehicle speed signal when the vehicle speed is lower than a predetermined second low speed which is lower than the first low speed, an accelerator pedal switch for producing an accelerator pedal signal when an accelerator pedal of the vehicle is released, first means responsive to the first vehicle speed signal for supplying current to a coil of the electromagnetic clutch, second means responsive to the accelerator pedal signal and absence of said first and second vehicle speed signals for cutting off the clutch current to the coil when the vehicle speed is between the first flow speed and the second low speed, and third means responsive to the accelerator pedal signal and to the second vehicle speed signal for generating a drag current for the coil.

2. The system for controlling an electromagnetic clutch according to claim 1 further comprising an engine speed sensor for producing a signal dependent on the engine speed, and fourth means for supplying the clutch current to the coil so as to increase with an increase of the engine speed in response to the signal of the engine speed sensor at the start of the vehicle in the absence of said accelerator pedal signal.

3. The system according to claim 1 wherein said first means responsive to the first vehicle speed signal for supplying lock-up clutch current to the coil of the electromagnetic clutch.

4. A method for controlling an electromagnetic clutch for a vehicle having an infinitely variable belt-drive transmission, comprising the steps of detecting speed of the vehicle and determining when the vehicle speed is higher than a predetermined first low speed and determining when the vehicle speed is lower than a predetermined second low speed which is lower than the first low speed, detecting release of an accelerator pedal of the vehicle, supplying clutch current to a coil of the electromagnetic clutch when the vehicle speed is higher than the predetermined first low speed, cutting off the clutch current to the coil when the accelerator pedal is released when the vehicle speed is between the first low speed and the second low speed, and generating a drag current for the coil when the accelerator pedal is released when the vehicle speed is lower than the second low speed.

* * * * *